US012246624B2

(12) United States Patent
Kumamoto et al.

(10) Patent No.: US 12,246,624 B2
(45) Date of Patent: Mar. 11, 2025

(54) FRAME STRUCTURE OF VEHICLE SEAT

(71) Applicant: TOYOTA BOSHOKU KABUSHIKI KAISHA, Aichi-ken (JP)

(72) Inventors: Munetomo Kumamoto, Fujisawa (JP); Yuki Abe, Fujisawa (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 103 days.

(21) Appl. No.: 18/181,931

(22) Filed: Mar. 10, 2023

(65) Prior Publication Data

US 2023/0322130 A1    Oct. 12, 2023

(30) Foreign Application Priority Data

Apr. 8, 2022   (JP) ................................. 2022-064589

(51) Int. Cl.
*B60N 2/16*   (2006.01)
*B60N 2/02*   (2006.01)

(52) U.S. Cl.
CPC ....... *B60N 2/1615* (2013.01); *B60N 2/02246* (2023.08); *B60N 2/165* (2013.01); *B60N 2/02253* (2023.08)

(58) Field of Classification Search
CPC .. B60N 2/161; B60N 2/1615; B60N 2/02246; B60N 2/165; B60N 2/02253
USPC .................................................. 297/344.15
See application file for complete search history.

(56) References Cited

U.S. PATENT DOCUMENTS

| 6,422,651 | B1 * | 7/2002 | Muhlberger | B60N 2/168 248/292.12 |
| 8,585,148 | B2 * | 11/2013 | Yamada | B60N 2/43 297/344.14 |
| 8,800,947 | B2 * | 8/2014 | Suzuki | B60N 2/161 248/421 |
| 10,358,052 | B1 * | 7/2019 | Mizukoshi | B60N 2/1655 |
| 2005/0023870 | A1 * | 2/2005 | Aufrere | B60N 2/1615 297/216.13 |
| 2009/0058158 | A1 * | 3/2009 | Sobieski | B60N 2/0296 297/358 |

(Continued)

FOREIGN PATENT DOCUMENTS

JP    2014-136439 A    7/2014

*Primary Examiner* — Jose V Chen
(74) *Attorney, Agent, or Firm* — Oblon, McClelland, Maier & Neustadt, L.L.P.

(57) ABSTRACT

A frame structure of the vehicle seat includes: a seat frame that constitutes a seat surface part of the vehicle seat; a pinion that is rotatably attached to the seat frame, and protrudes from an outer side to an inner side in a vehicle width direction; a drive input gear that is disposed on the inner side in the vehicle width direction with respect to the seat frame, is rotatable about a rotary shaft at a position different from the pinion, and enmeshes with the pinion; a reinforcement member that is disposed between the seat frame and the drive input gear in the vehicle width direction, and is fixed to the seat frame; and a support member that is disposed on the inner side in the vehicle width direction with respect to the seat frame with the drive input gear and the reinforcement member interposed therebetween, supports part of the pinion, and is fixed to the seat frame, and part of the support member comes into contact with the seat frame through an insertion part provided to the reinforcement member.

8 Claims, 10 Drawing Sheets

(56) References Cited

U.S. PATENT DOCUMENTS

| | | | |
|---|---|---|---|
| 2009/0273220 A1* | 11/2009 | Kim | B60N 2/02246 297/423.28 |
| 2015/0306983 A1* | 10/2015 | Takei | B60N 2/167 297/183.9 |
| 2016/0059752 A1* | 3/2016 | Kishida | B60N 2/02246 297/344.12 |
| 2019/0039483 A1* | 2/2019 | Meinel | B60N 2/165 |
| 2019/0070982 A1* | 3/2019 | Kajino | B60N 2/1685 |
| 2019/0092200 A1* | 3/2019 | Minegishi | B60N 2/682 |
| 2019/0193598 A1* | 6/2019 | Kim | B60N 2/165 |
| 2020/0009996 A1* | 1/2020 | Brodersen | B60N 2/169 |
| 2020/0298738 A1* | 9/2020 | Tachikawa | B60N 2/1615 |
| 2021/0146805 A1* | 5/2021 | Suzuki | F16H 19/04 |
| 2021/0261023 A1* | 8/2021 | Muehlenbrock | B60N 2/682 |
| 2021/0284047 A1* | 9/2021 | Okamoto | B60N 2/0722 |

* cited by examiner

FRAME STRUCTURE OF VEHICLE SEAT

CROSS REFERENCE TO RELATED APPLICATIONS

This application is based upon and claims the benefit of priority of the prior Japanese Patent Application No. 2022-064589, filed on Apr. 8, 2022, the entire contents of which are incorporated herein by reference.

BACKGROUND OF THE INVENTION

Field of the Invention

The present invention relates to a frame structure of a vehicle seat.

Description of the Related Art

The vehicle seat is designed assuming that various loads are applied to the vehicle seat due to collision of a vehicle or the like. For example, a vehicle seat including gear mechanisms involved in a seat operation is required to prevent an enmeshing failure or damages of the gear mechanisms due to an impact from an outside.

As an example of a vehicle seat including gear mechanisms, a lifter mechanism-equipped vehicle seat that changes a height position of a seat surface of a seat is known (e.g., Japanese Laid-Open Patent Publication No. 2014-136439). More specifically, a cushion frame (side frames disposed at seat surface side parts in particular) that constitute a framework of a seat surface part is supported movably in an upper/lower direction via lifter mechanisms of four-link structures with respect to a floor surface of a vehicle (seat tracks attached to the floor surface or the like). Furthermore, a sector gear provided at part of the lifter mechanism and a pinion provided on the cushion frame side are enmeshed, and the lifter mechanism is operated in response to rotation and driving of the pinion to move the cushion frame up and down.

According to a conventional lifter mechanism-equipped seat, when a load due to rear end collision (so-called rear collision) is applied to a vehicle from a rear direction, a load to separate respective rotation center positions (i.e., to increase an inter-axial distance) of a pinion and a sector gear is applied to a cushion frame, and an enmeshing failure (a decrease in an enmeshing amount or the like) of the sector gear with respect to the pinion has been concerned to occur. The load tends to locally concentrate due to the enmeshing failure, and causes chipping of teeth of the sector gear or the like.

SUMMARY OF THE INVENTION

According to the lifter mechanism-equipped seat of Japanese Laid-Open Patent Publication No. 2014-136439, the lifter mechanism is attached to one side of the cushion frame (side frame), and a support arm for suppressing an inter-axial repulsion force acting between the pinion gear and the sector gear is further attached to the cushion frame. The support arm includes one end fixed to the cushion frame, and fits a slide pin provided at an other end in an arc-shaped long hole formed in a rear link including the sector gear. Furthermore, an output shaft that is a rotation center of the pinion is inserted in an intermediate part of the support arm.

Japanese Laid-Open Patent Publication No. 2014-136439 adopts a structure that the cushion frame receives a load, too, produced at the support arm in addition to the load produced in the cushion frame itself, and the cushion frame entirely is in charge of securing strength for suppressing the inter-axial repulsion force between the pinion gear and the sector gear. Hence, the cushion frame needs high rigidity. However, selecting a metal plate of a large plate thickness as a cushion frame material, and increasing a thickness of the entire cushion frame increase rigidity, yet cause problems such as an increase in weight, poor workability, and an increase in cost due to a substantial increase in materials cost.

Furthermore, the support arm of Japanese Laid-Open Patent Publication adopts the structure that fits the slide pin in the long hole of the rear link, and directly regulates movement of the rear link, and therefore is concerned to disturb a smooth operation of the rear link.

The present invention provides a frame structure of a vehicle seat that realizes improvement of strength around gear mechanisms with a small and light structure.

The present invention includes: a seat frame that constitutes a seat surface part of a vehicle seat; a pinion that is rotatably attached to the seat frame, and protrudes from an outer side to an inner side in a vehicle width direction; a drive input gear that is disposed on the inner side in the vehicle width direction with respect to the seat frame, is rotatable about a rotary shaft at a position different from the pinion, and enmeshes with the pinion; a reinforcement member that is disposed between the seat frame and the drive input gear in the vehicle width direction, and is fixed to the seat frame; and a support member that is disposed on the inner side in the vehicle width direction with respect to the seat frame with the drive input gear and the reinforcement member interposed therebetween, supports part of the pinion, and is fixed to the seat frame, and part of the support member comes into contact with the seat frame through an insertion part provided to the reinforcement member.

Preferably, the present invention further includes a fixing member that fixes the pinion to the seat frame, and the support member is also supported at the seat frame by the fixing member.

Preferably, the reinforcement member includes a through hole that penetrates the part of the pinion, a first extension part that extends toward a side of the rotary shaft of the drive input gear with the through hole serving as a position reference, and a second extension part that extends toward a side opposite to the rotary shaft of the drive input gear with the through hole serving as the position reference, and the first extension part has a longer length from the through hole than the second extension part.

Preferably, the insertion part is provided to the first extension part.

Preferably, the present invention further includes a fixing member that fixes the pinion to the seat frame, the drive input gear includes an arc-shaped long hole whose center is the rotary shaft, the part of the support member is a vehicle width extended part that is inserted in the long hole and the insertion part and comes into contact with the seat frame, and a gap between the vehicle width direction extended part and the insertion part is smaller than a gap between the vehicle width direction extended part and the long hole.

Preferably, the fixing member is a screw, and the vehicle width direction extended part is cylindrical, and the screw that fastens and fixes the seat frame and the support member is inserted inside the vehicle width direction extended part.

According to a frame structure of a vehicle seat according to the present invention, a reinforcement member reinforces a seat frame, and the reinforcement member receives a load from a support member, so that it is possible to realize improvement of strength around gear mechanisms with a small and light structure having a reduced seat frame thickness. Furthermore, the support member comes into contact with the seat frame through an insertion part of the reinforcement member, so that a motion in a vehicle longitudinal direction and a motion in a vehicle width direction of the support member can be suppressed by the reinforcement member and the seat frame, respectively.

DETAILED DESCRIPTION OF THE PREFERRED EMBODIMENTS

Figure 1:
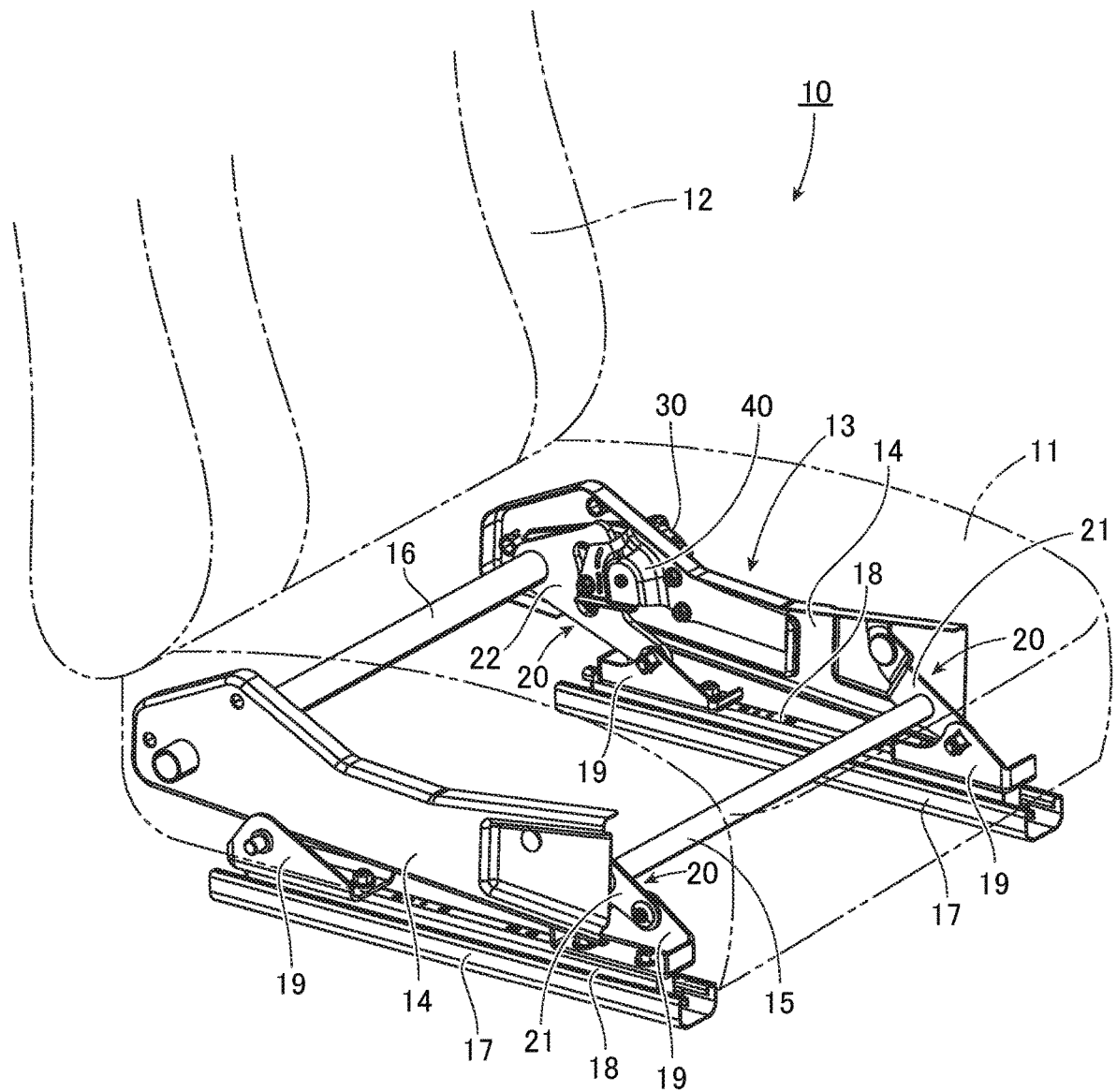
FIG. 1 is a view illustrating a schematic configuration of a vehicle seat.
Figure 2:
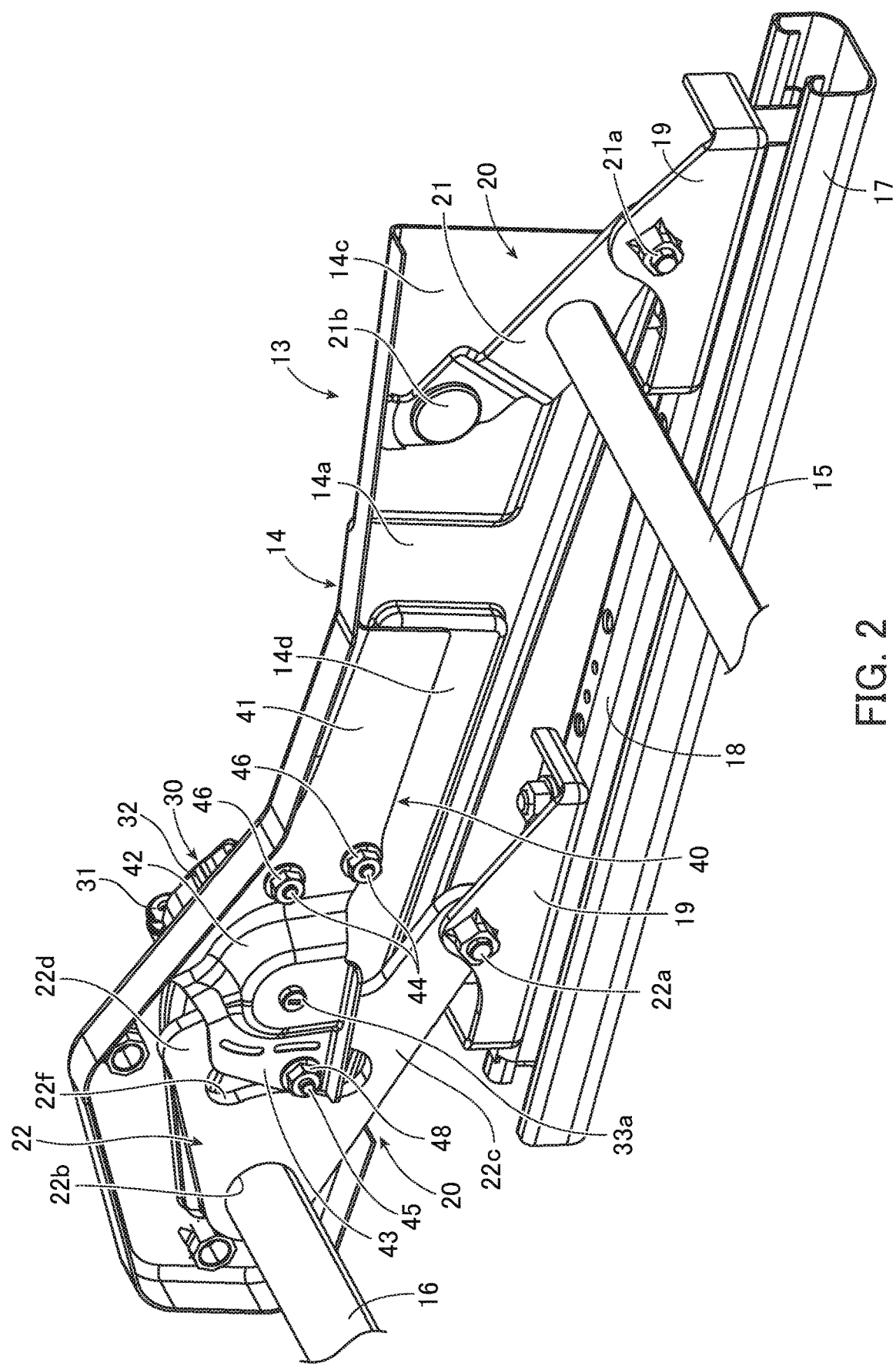
FIG. 2 is a perspective view illustrating a frame structure on one side of the vehicle seat.
Figure 3:
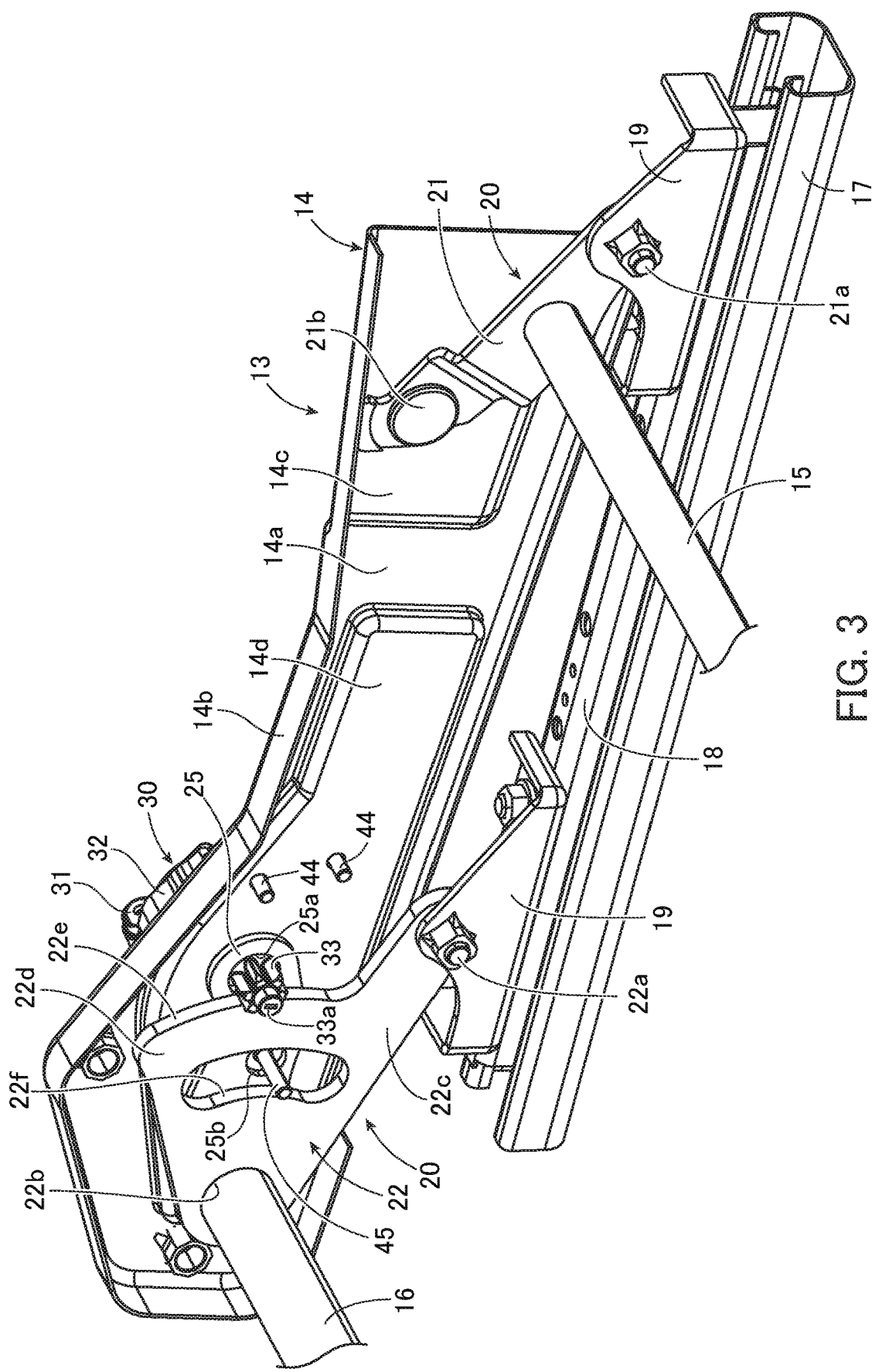
FIG. 3 is a perspective view of the frame structure on the one side without a support plate.

An embodiment to which the present invention is applied will be described below with reference to the drawings. A vehicle seat 10 illustrated in FIG. 1 is a front seat of a car, and each of a front/rear direction, a left/right direction, and an upper/lower direction in the following description means a direction using as a position reference a vehicle on which the vehicle seat 10 is mounted. The left/right direction is also referred to as a vehicle width direction, the vehicle width direction includes a center side of the vehicle seat 10 as a seat inner side, and left and right lateral sides as seat outer sides. For example, a right side and a left side of a left side frame 14 of a pair of the left and right side frames 14 described below are the seat inner side and the seat outer side, and a left side and a right side of the right side frame 14 are the seat inner side and the seat outer side.

The vehicle seat 10 includes a seat cushion 11 that is a seat surface part, and a seat back 12 that is a backrest part. The seat back 12 is supported near a rear end part of the seat cushion 11 tiltably in the front/rear direction. A cushion frame 13 that constitutes a framework of the seat cushion 11 adopts a frame-shaped structure that includes a pair of left and right side frames (seat frames) 14 that are disposed apart from each other in the vehicle width direction, and extend in the front/rear direction, and connects the pair of side frames 14 by a cylindrical front pipe 15 and rear pipe 16 extending in the vehicle width direction. Illustration of a seat back frame that constitutes a framework of the seat back 12 is omitted.

Main parts of the cushion frame 13 including the side frames 14 are provided separately to left and right side parts of the vehicle seat 10, and FIGS. 2 to 10 illustrate the left frame structure. Although basic parts of frame structures are common between the left and right frame structures, a driving unit 30 (details thereof will be described below) that is a driving source, and parts related to the driving unit 30 are included only in the left frame structure. A right frame structure operates accompanying the left frame structure via the front pipe 15 and the rear pipe 16.

The seat cushion 11 and the seat back 12 are supported movably in the front/rear direction by a pair of left and right seat tracks attached to a vehicle floor surface. Each seat track includes a lower rail 17 that is fixed to the vehicle floor surface, and an upper rail 18 that is movably in the front/rear direction with respect to the lower rail 17. The lower rails 17 slide in the front/rear direction with respect to the upper rails 18, so that it is possible to adjust a position in the front/rear direction of the vehicle seat 10. A slide lock mechanism whose illustration is omitted fixes positions of the upper rails 18 with respect to the lower rails 17.

A pair of front and rear support brackets 19 are fixed to an upper face side near a front end and a rear end of each upper rail 18. Each of the pair of left and right side frames 14 is supported on the support brackets 19 with a lifter mechanism 20 interposed therebetween. The lifter mechanism 20 adopts a four-link structure that a front link 21 and a rear link 22 that are each rotatable with respect to the side frame 14 and the support brackets 19 are disposed apart from each other in the front/rear direction, and an operation of the lifter mechanism 20 can adjust a height position of the vehicle seat 10 with respect to the vehicle floor surface.

The front link 21 connects a connection part 21a near one end in a longitudinal direction rotatably with respect to the front support bracket 19, and connects a connection part 21b near an other end in the longitudinal direction rotatably with respect to the side frame 14. The pair of left and right front links 21 are connected by the front pipe 15, and the front pipe 15 connects to a vicinity of a center (an intermediate position of the connection part 21a and the connection part 21b) in the longitudinal direction of each front link 21.

The rear link 22 connects a connection part 22a near one end in the longitudinal direction rotatably with respect to the rear support bracket 19, and is provided with a circular through hole 22b formed near an other end in the longitudinal direction. The rear link 22 includes a linear arm part 22c that extends from the connection part 22a to the through hole 22b, and a fan-shaped sector gear plate 22d that is located on an upper side of the arm part 22c and widens toward a front direction. At a front edge of the sector gear plate 22d, an arc-shaped sector gear 22e whose center is the through hole 22b is formed. The sector gear 22e includes a plurality of gear teeth that are continuously disposed in a circumferential direction. Note that the drawings omit illustration of the individual gear teeth of the sector gears 22e. The rear link 22 further includes an arc-shaped long hole 22f that is formed between the sector gear 22e and the through hole 22b and whose center is the through hole 22b. The sector gear plate 22d is a drive input gear that is rotatable about the rear pipe 16 that is a rotary shaft, and enmeshes with a pinion 33 of the driving unit 30 described below, and transmits a driving force from the driving unit 30 to the lifter mechanisms 20.

Each side frame 14 is formed by performing press working or the like on a metal plate material. The left side frame 14 includes a base part 14a whose plate thickness direction is the vehicle width direction, and a flange part 14b that protrudes from a peripheral edge of the base part 14a to the seat inner side. At a part close to a front end of the side frame 14, a front step part 14c that protrudes toward the seat inner side from the base part 14a is formed. In a rear direction of the front step part 14c, a rear step part 14d that protrudes toward the seat inner side from the base part 14a is formed.

Shapes that protrude in the vehicle width direction from the base part 14a are formed like the flange part 14b, the front step part 14c, and the rear step part 14d to enhance cross-sectional strength of the side frame 14. Faces of the front step part 14c and the rear step part 14d that face the seat inner side and the seat outer side have flat shapes, and serve as a position reference of each member to be assembled to the side frame 14.

Figure 4:
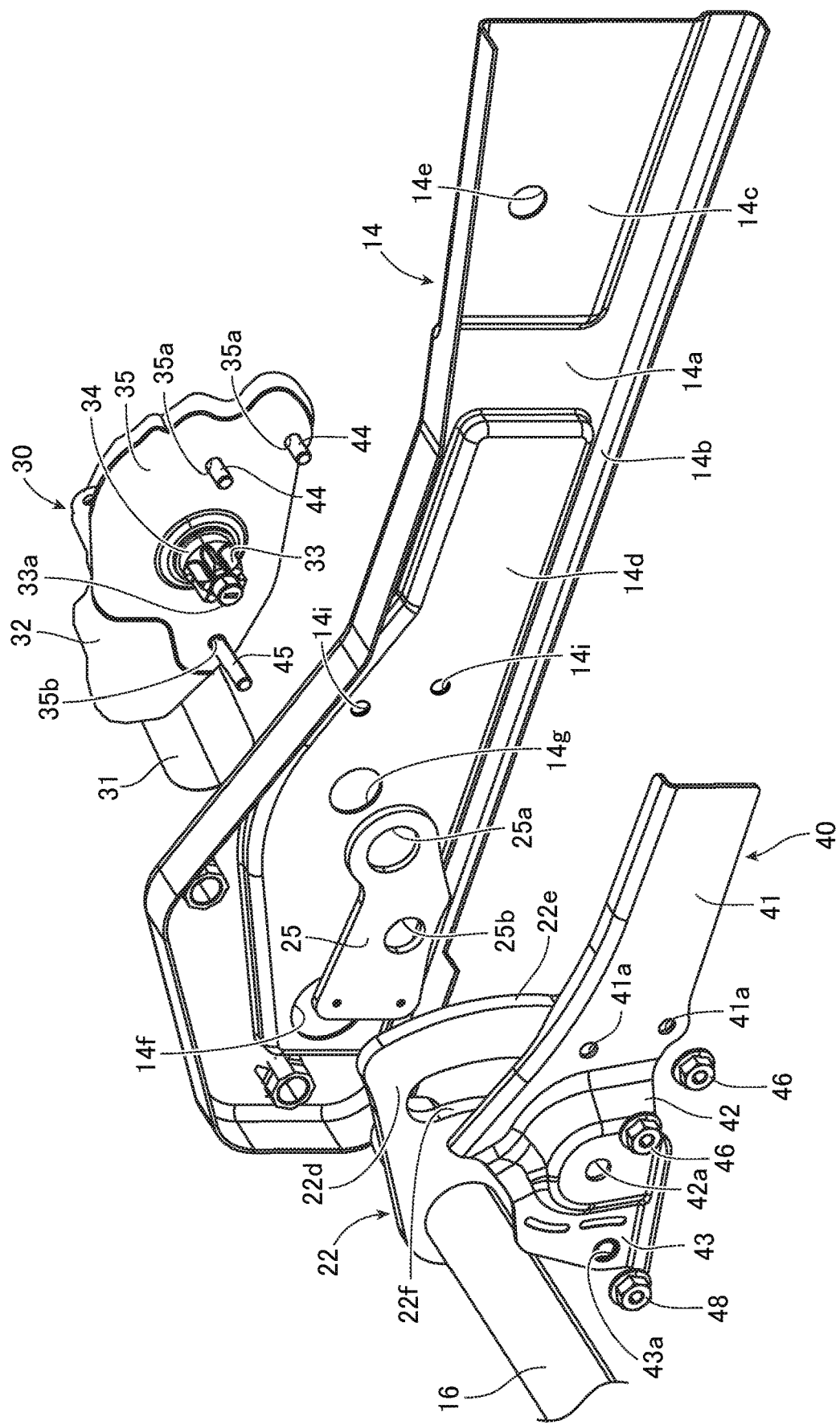
FIG. 4 is an exploded perspective view of the frame structure on the one side.

As illustrated in FIG. 4, a support hole 14e that penetrates in the vehicle width direction is formed in the front step part 14c. A connection part 21a of the front link 21 is supported rotatably in the support hole 14e.

As illustrated in FIG. 4, a circular through hole 14f and through hole 14g that respectively penetrate in the vehicle width direction are formed in the rear step part 14d. The through hole 14f is located near a rear end of the rear step part 14d, and the through hole 14g is disposed in the front direction with a predetermined interval spaced apart from the through hole 14f. In the rear step part 14d, a fastening hole 14h (see FIG. 10) located between the through hole 14f and the through hole 14g in the front/rear direction, and a pair of fastening holes 14i located in the front direction of the through hole 14g are further formed.

The rear link 22 is disposed on the seat inner side of the side frame 14, and the rear pipe 16 is inserted in the through hole 22b and the through hole 14f. The rear pipe 16 is fixed to the through hole 22b, and is supported rotatably in the through hole 14f.

Consequently, the rear link 22 is connected to the side frame 14 rotatably about the rear pipe 16. In other words, the sector gear plate 22d is rotatably supported with the rear pipe 16 serving as the rotary shaft.

Front parts of the pair of left and right side frames 14 interlock via the front pipe 15 connected to the pair of left and right front links 21. Furthermore, rear parts of the pair of left and right side frames 14 are connected and interlock via the rear pipe 16. Thus, the pair of left and right side frames 14 integrally move in the front/rear direction or the upper/lower direction.

Figure 8:
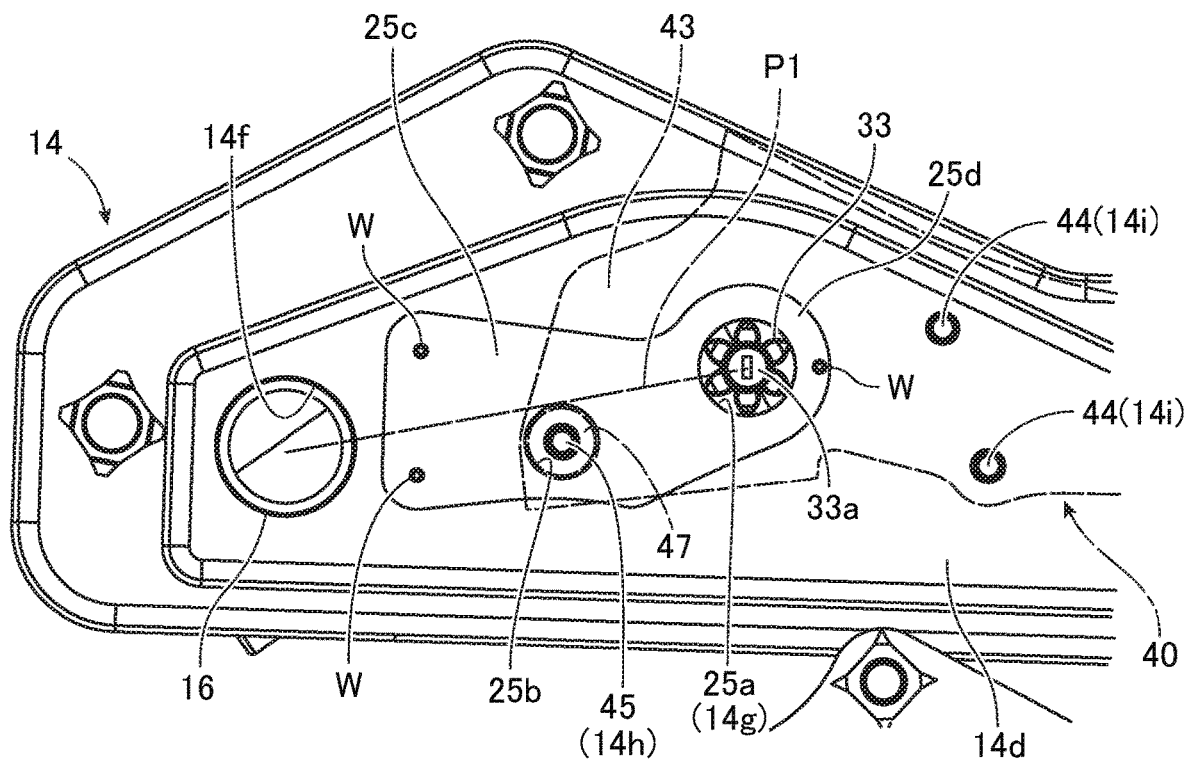
FIG. 8 is a side view enlarging part of FIG. 7.
Figure 9:
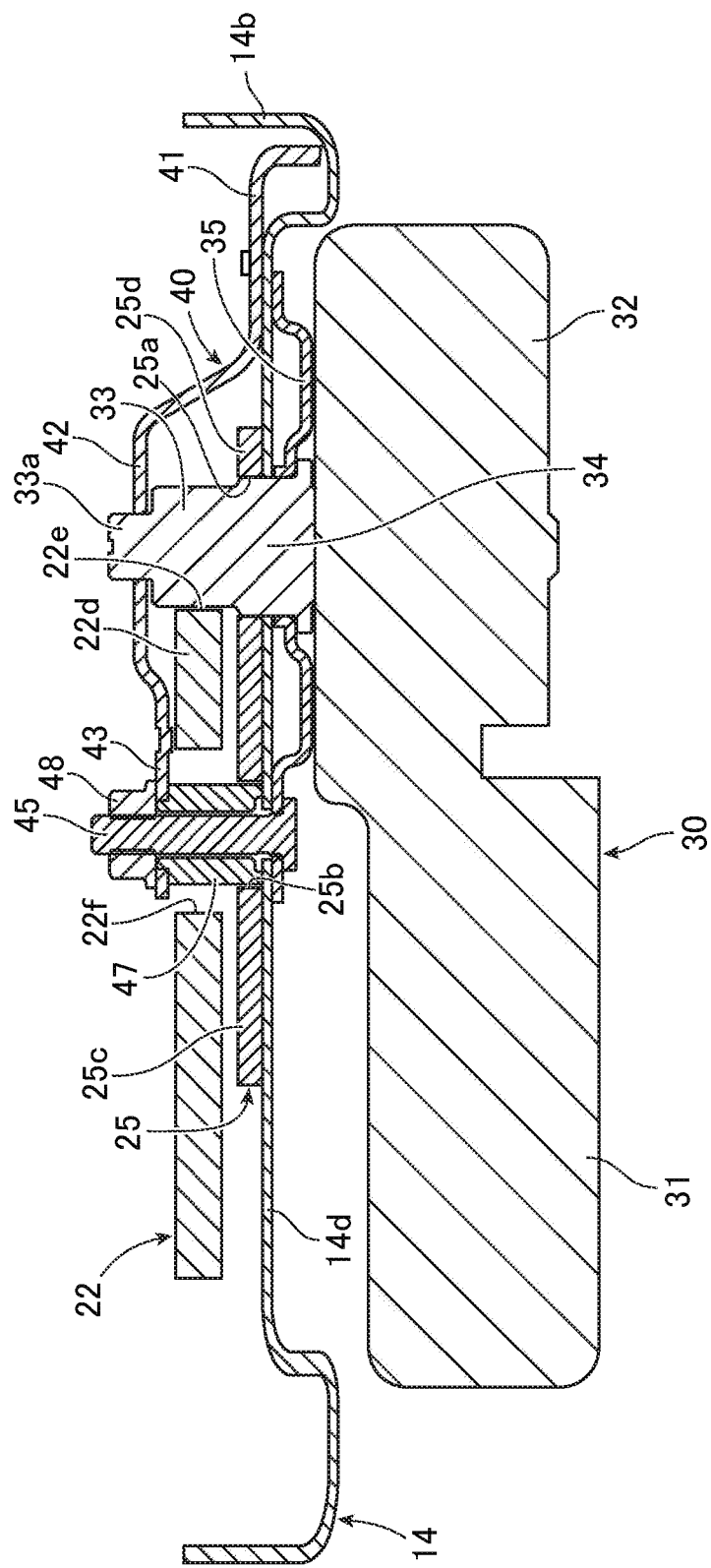
FIG. 9 is a cross-sectional view taken along line IX-IX in FIG. 5.
Figure 10:
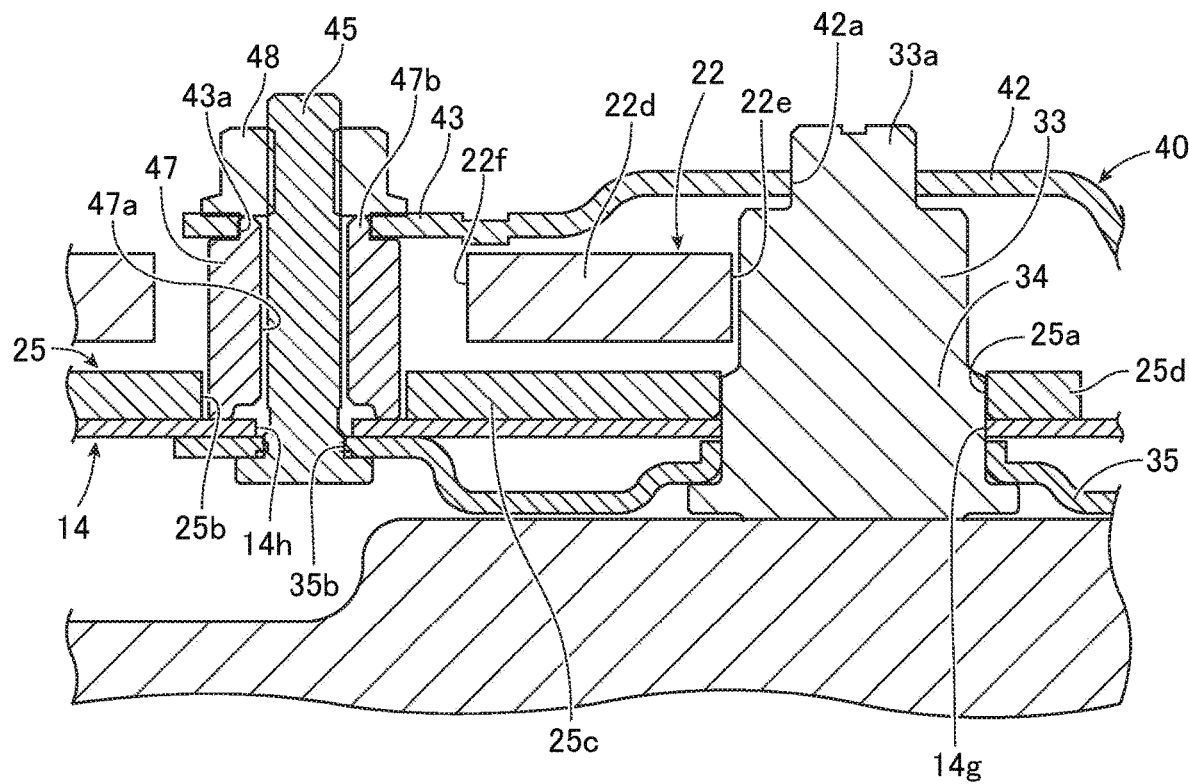
FIG. 10 is a cross-sectional view enlarging part of FIG. 9.

On a face on the seat inner side of the rear step part 14d of the side frame 14, a reinforcement plate 25 that is a reinforcement member is attached. As illustrated in FIGS. 9 and 10, the reinforcement plate 25 is formed by a metal plate material having a larger thickness in the vehicle width direction than that of the side frame 14, is formed separately from the side frame 14, and then is fixed to the side frame 14. In the present embodiment, the reinforcement plate 25 is welded and fixed to the side frame 14. Welding positions W (three portions) of the reinforcement plate 25 are illustrated in FIG. 8. Note that different positions from the welding positions W can be also welded, and a fixing method other than welding can be also selected. Note that the reinforcement plate 25 may have the same thickness in the vehicle width direction as that of the side frame 14, or may have a thinner thickness than that of the side frame 14. Furthermore, although the reinforcement plate 25 is fixed to the side frame 14 by welding using a metal in the present embodiment, the reinforcement plate 25 may be made of a resin and fixed to the side frame 14 by means such as adhesion other than welding.

Figure 7:
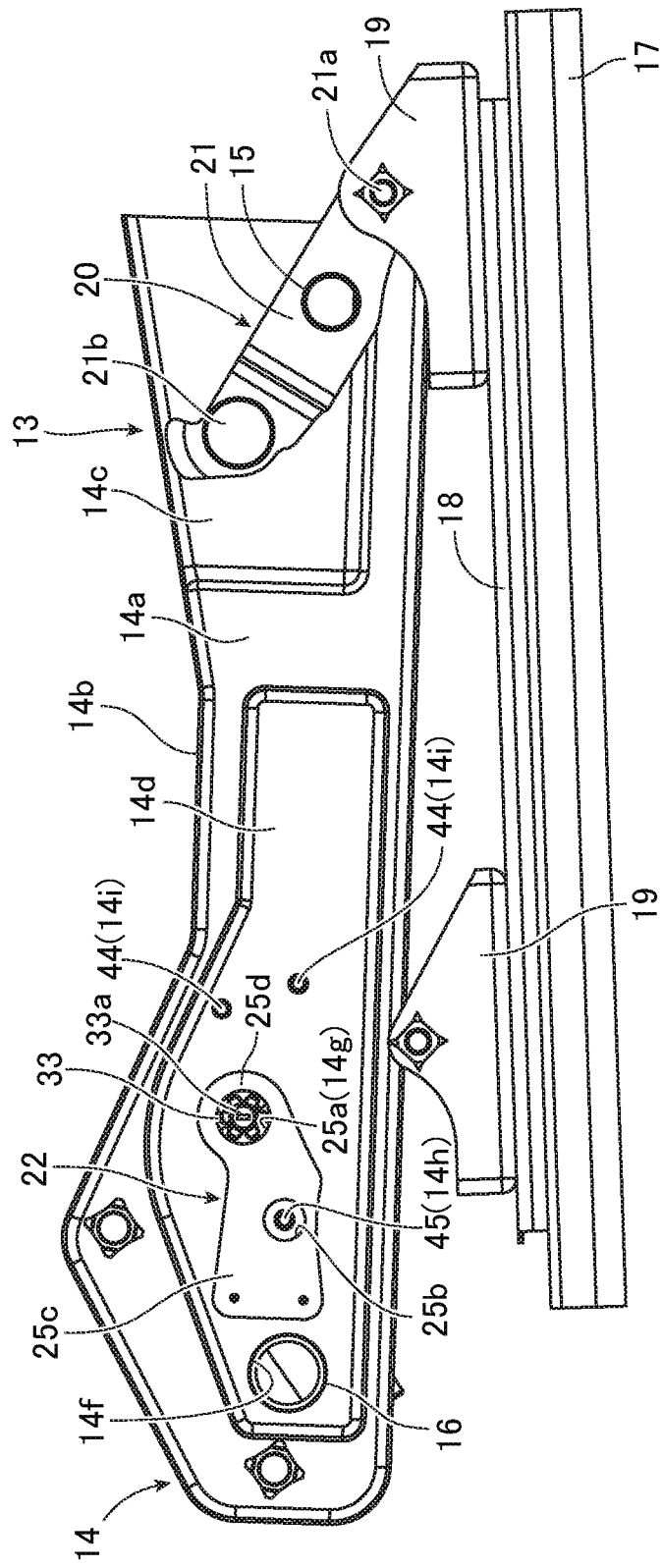
FIG. 7 is a side view of the frame structure on the one side without the support plate and a rear link.

As illustrated in FIGS. 7 and 8, the reinforcement plate 25 has a shape that is elongated in the front/rear direction. A front end of the reinforcement plate 25 is located in the front direction of the through hole 14g and in the rear direction of the fastening holes 14i. A rear end of the reinforcement plate 25 is located in the rear direction of the fastening hole 14h, and in the front direction of the through hole 14f. That is, the reinforcement plate 25 exists within a range that overlaps the through hole 14g and the fastening hole 14h of the side frame 14. Furthermore, in the reinforcement plate 25, a through hole 25a that continues to the through hole 14g and a receiving hole (insertion part) 25b that continues to the fastening hole 14h are formed to penetrate in the vehicle width direction (see FIGS. 4 and 10). As illustrated in FIG. 10, the through hole 25a is a circular hole having substantially the same diameter as that of the through hole 14g, and respective center positions of the through hole 25a and the through hole 14g match. The receiving hole 25b is a circular hole having a larger diameter than that of the fastening hole 14h, and respective center positions of the receiving hole 25b and the fastening hole 14h match.

As illustrated in FIGS. 9 and 10, the reinforcement plate 25 is located between the side frame 14 and the rear link 22 in the vehicle width direction. In other words, the reinforcement plate 25 is disposed to fill the gap between the side frame 14 and the rear link 22 in the vehicle width direction. The reinforcement plate 25 and the rear link 22 are not in contact in the vehicle width direction, and there is a gap therebetween. The long hole 22f of the rear link 22 is located with a predetermined interval spaced apart from the receiving hole 25b of the reinforcement plate 25 to the seat inner side. As illustrated in FIG. 10, a width of the long hole 22f in a radial direction of the sector gear plate 22d is larger than a diameter (inner diameter) of the receiving hole 25b.

On the seat outer side of the side frame 14, the driving unit 30 that is the driving source of the lifter mechanisms 20 is attached. The driving unit 30 includes a motor 31, a gear housing 32, and the pinion 33. The pinion 33 is rotatable about a pinion shaft 33a that extends in the vehicle width direction. Rotation of an output shaft of the motor 31 decelerates via a gear train (not illustrated) disposed in the gear housing 32, and is transmitted to the pinion shaft 33a, and the pinion 33 rotates about the pinion shaft 33a. The pinion 33 protrudes from the gear housing 32 toward the seat inner side. A proximal end part of the pinion 33 is provided with a cylindrical pinion base part 34 that has a larger diameter than that of a tooth part of the pinion 33. The pinion base part 34 is integrally formed as part of the pinion 33.

A face on the seat inner side of the gear housing 32 is provided with a seat surface plate 35, and, when the driving unit 30 is attached to the side frame 14, the seat surface plate 35 is placed in contact with a face on the seat outer side of the rear step part 14d (see FIGS. 9 and 10). In this case, the pinion 33 is inserted in the through hole 14g and the through hole 25a from the seat outer side to the seat inner side. When the driving unit 30 is moved until the seat surface plate 35 comes into contact with the rear step part 14d, the pinion base part 34 is located on inner sides of the through hole 14g and the through hole 25a, and the pinion 33 protrudes toward the seat inner side compared to the side frame 14 and the reinforcement plate 25. Furthermore, the pinion 33 reaches the same position as that of the sector gear plate 22d in the vehicle width direction, and the sector gear 22e and the pinion 33 enmesh with each other.

Figure 5:
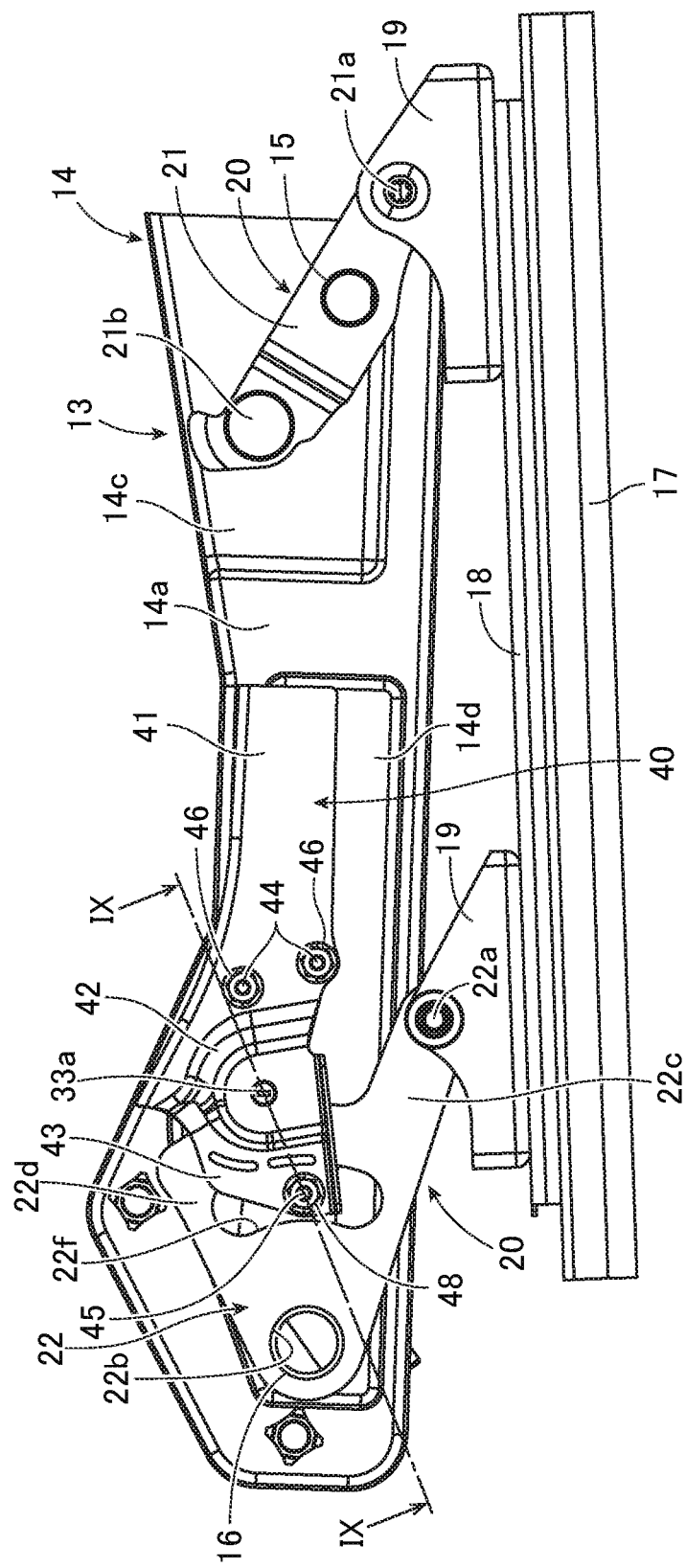
FIG. 5 is a side view illustrating the frame structure on the one side seen from a seat inner side.
Figure 6:
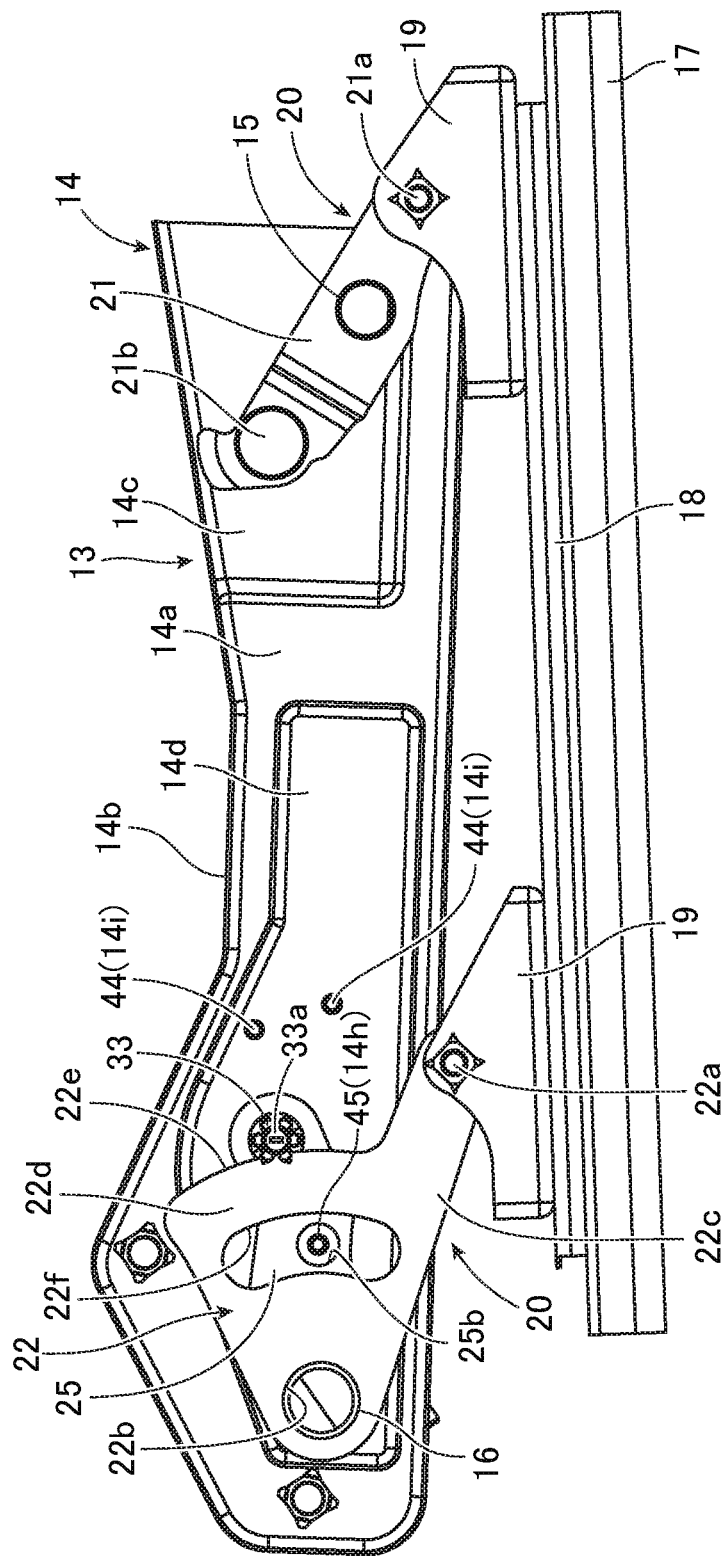
FIG. 6 is a side view of the frame structure on the one side without the support plate.

The driving unit 30 is fixed to the side frame 14 by using a support plate 40. As illustrated in FIGS. 4 and 5, the support plate 40 includes a base plate part 41, a pinion cover part 42, and a rear extension part 43.

The base plate part 41 overlaps a face on the seat inner side of the rear step part 14d. The base plate part 41 has a shape that is elongated in the front/rear direction, and a vicinity of a front end of the rear step part 14d to a vicinity of the pair of fastening holes 14i is a range where the base plate part 41 overlaps the side frame 14.

The pinion cover part 42 is located in the rear direction of the base plate part 41, and has a shape that covers the pinion 33 protruding toward the seat inner side compared to the base plate part 41.

The rear extension part 43 is located closer to the seat inner side than the base plate part 41 in the vehicle width direction, is located in the rear direction of the pinion cover part 42 in the front/rear direction, and covers part of the rear link 22 (mainly the sector gear plate 22d) from the seat inner side. The rear extension part 43 and the rear link 22 are not in contact in the vehicle width direction, and there is a gap therebetween.

As illustrated in FIG. 4, a pair of fastening holes 41a that penetrate in the vehicle width direction are formed at positions of the base plate part 41 near the pinion cover part 42. The pair of fastening holes 41a are provided at positions meeting (aligned in the vehicle width direction with) the pair of fastening holes 14i of the side frame 14. In the pinion cover part 42, a pinion support hole 42a that penetrates in the vehicle width direction is formed. The pinion support hole 42a is provided at a position meeting (aligned in the vehicle width direction with) the through hole 14g of the side frame 14 and the through hole 25a of the reinforcement plate 25, and a center position of the pinion support hole 42a and the center positions of the through hole 14g and the through hole 25a match. In the rear extension part 43, a fitting hole 43a that penetrates in the vehicle width direction is formed. The fitting hole 43a is provided at a position meeting (aligned in the vehicle width direction with) the fastening hole 14h of the side frame 14 and the receiving hole 25b of the reinforcement plate 25, and a center position of the fitting hole 43a matches with the center positions of the fastening hole 14h and the receiving hole 25b.

The rear extension part 43 is located closer to the seat inner side than the rear link 22, and the support plate 40 is attached to the seat inner side of the side frame 14 so as to cover the rear link 22 and the reinforcement plate 25. A distal end of the pinion shaft 33a that is part of the pinion 33 is inserted in the pinion support hole 42a. The distal end of the pinion shaft 33a and the pinion support hole 42a are respectively circular, and the pinion shaft 33a is rotatably supported in the pinion support hole 42a.

In this state, the driving unit 30 and the support plate 40 are fastened and fixed to the side frame 14 using a pair of fixing screws 44 and one fixing screw 45. The fixing screws 44 and the fixing screw 45 include shaft parts that protrude from head parts of large diameters, and male screws are formed on outer circumferential surfaces of the shaft parts. The shaft part of the fixing screw 45 is longer than the shaft parts of the fixing screws 44.

The shaft part of each fixing screw 44 protrudes toward the seat inner side through a through hole 35a (FIG. 4) formed in the seat surface plate 35. Furthermore, the shaft part of each fixing screw 44 is inserted in the fastening hole 14i and the fastening hole 41a from the seat outer side to the seat inner side, and protrudes from the support plate 40 to the seat inner side. This protrusion part of the fixing screw 44 is screwed with a nut 46 (see FIGS. 2 and 5).

As illustrated in FIGS. 9 and 10, the reinforcement plate 25 and the rear link 22 (sector gear plate 22d) are disposed between the rear step part 14d of the side frame 14 and the rear extension part 43 of the support plate 40 in the vehicle width direction. The rear step part 14d and the rear extension part 43 face each other with an interval equal to or more than a sum of the thicknesses of the reinforcement plate 25 and the rear link 22 spaced apart from each other. To fill this interval in the vehicle width direction and fasten the rear step part 14d and the rear extension part 43, a collar 47 is attached to the support plate 40 (see FIGS. 9 and 10).

As illustrated in FIG. 10, the collar 47 has a cylindrical shape that extends in the vehicle width direction, and an internal through hole 47a that penetrates in the vehicle width direction is formed therein. At an end part on the seat inner side of the collar 47, a fitting step part 47b that has a smaller diameter than that of a main body part of the collar 47 is formed. The fitting step part 47b is inserted and fitted in the fitting hole 43a of the rear extension part 43 to fix the collar 47 to the rear extension part 43. The support plate 40 and the collar 47 are coupled in advance prior to assembly of the cushion frame 13, and prepared as a support member (support plate assembly) formed by combining the support plate 40 and the collar 47. The collar 47 constitutes a vehicle width direction extended part that is part of this support member.

The shaft part of the fixing screw 45 protrudes toward the seat inner side through a through hole 35b (see FIGS. 4 and 10) that is formed in the seat surface plate 35. Furthermore, the shaft part of the fixing screw 45 is inserted in the fastening hole 14h and the inner through hole 47a (that includes an insertion area of the collar 47 with respect to the fitting hole 43a) from the seat outer side to the seat inner side, and protrudes from the support plate 40 to the seat inner side. This protrusion part of the fixing screw 45 is screwed with a nut 48. A thickness of the rear extension part 43 is set slightly larger than a protrusion amount of the fitting step part 47b in the width direction, and, when the fixing screw 45 and the nut 48 are screwed, the nut 48 is mainly in contact with a face on the seat inner side of the rear extension part 43. A face on the seat outer side of the rear extension part 43 is in contact with one end (surroundings of a proximal end part of the fitting step part 47b) of the collar 47, an other end of the collar 47 is in contact with the rear step part 14d, and thereby the rear extension part 43 and the collar 47 are sandwiched between the nut 48 and the side frame 14.

When a predetermined tightening torque is applied to the fixing screws 44 and the nuts 46, the seat surface plate 35, the side frame 14 (rear step part 14d), and the base plate part 41 of the support plate 40 are sandwiched between the head parts of the fixing screws 44 and the nuts 46, and are stacked and fixed in the vehicle width direction. Furthermore, when a predetermined tightening torque is applied to the fixing screw 45 and the nut 48, the seat surface plate 35, the side frame 14 (rear step part 14d), the collar 47, and the rear extension part 43 of the support plate 40 are sandwiched between the head part of the fixing screw 45 and the nut 48, and are stacked and fixed in the vehicle width direction. Note that the collar 47 functions as a spacer in the vehicle width direction, and therefore a fastening force of the fixing screw 45 and the nut 48 does not act on the sector gear plate 22d and the reinforcement plate 25. Thus, the driving unit 30 is fastened and fixed to the side frame 14.

As illustrated in FIGS. 9 and 10, the collar 47 is inserted in the long hole 22f of the rear link 22. A width of the long hole 22f in the radial direction of the sector gear plate 22d is set a predetermined size or more larger than a diameter of the collar 47 such that there is a sufficient gap between the long hole 22f and the collar 47. The long hole 22f is an arc-shaped groove whose center is the through hole 22b (rear pipe 16), and enables rotation (swing) of the rear link 22 about the rear pipe 16 at a time of an operation of the lifter mechanisms 20 without being interfered by the collar 47.

As illustrated in FIG. 10, the collar 47 is further inserted in the receiving hole 25b of the reinforcement plate 25. The diameter (inner diameter) of the receiving hole 25b is smaller than the width of the long hole 22f, yet is set to have a predetermined gap or more with respect to the collar 47. That is, an outer circumferential surface of the collar 47 is designed to not contact an inner circumferential surface of the receiving hole 25b when the support plate 40 (rear extension part 43) and the driving unit 30 (seat surface plate 35) are fixed to the side frame 14 by the fixing screw 45 and the nut 48, so that it is possible to absorb a precision error (assembly error) between the reinforcement plate 25 and the support plate 40 more or less.

To sum up the main pats of the left frame structure with reference to FIGS. 9 and 10, the reinforcement plate 25, the rear link 22 (the sector gear plate 22d in particular) that constitutes the lifter mechanism 20, and the support plate 40 are disposed in order from the side close to the side frame 14 on the seat inner side that is one side in the vehicle width direction with respect to the side frame 14. The reinforcement plate 25 is fixed to the face on the seat inner side of the side frame 14. The rear extension part 43 of the support plate 40 is located apart from the side frame 14 to the seat inner side with the sector gear plate 22d and the reinforcement plate 25 interposed therebetween, and the collar 47 extended from the rear extension part 43 to the vehicle width direction (seat outer side) is placed in contact with the side frame 14, and is fastened and fixed to the side frame 14 using the fixing screw 45 and the nut 48. The sector gear plate 22d is supported rotatably about the rear pipe 16 with respect to the side frame 14 without contacting the support plate 40 and the reinforcement plate 25.

The driving unit 30 is disposed on the seat outer side that is the other side in the vehicle width direction with respect to the side frame 14. The driving unit 30 is fastened and fixed to the side frame 14 in such a manner that the driving unit 30 is tightened together with the support plate 40 (rear extension part 43) on the seat inner side using the fixing screw 45 and the nut 48. Consequently, it is possible to reduce the number of the fixing screws 45 that are fixing members. Furthermore, it is possible to reduce the number of holes to be formed in the side frame 14 to insert the fixing screws 45 therein, so that it is possible to suppress a decrease in strength of the side frame 14.

The lifter function-equipped cushion frame 13 is formed by assembling the lifter mechanisms 20 and the driving unit 30 to the side frame 14 as described above. When the motor 31 is driven to rotate the pinion 33, the rear link 22 operates while changing an enmeshing position of the sector gear 22e with respect to the pinion 33 to change a position of the rear pipe 16 with respect to the connection part 22a on the upper rail 18 (support bracket 19) side. The front link 21 also operates accompanying this change to change a position of the connection part 21b on the side frame 14 side with respect to the connection part 21a on the upper rail 18 (support bracket 19) side. As a result, a height position of the side frame 14 changes.

Unlike the above-described left frame structure, the right frame structure does not include the driving unit 30 (see FIG. 1). Accordingly, it is possible to use a type that does not include a sector gear for the rear link (illustration thereof is omitted) that constitutes the lifter mechanism 20 in the right frame structure.

By the way, when another vehicle or the like causes rear end collision (so-called rear collision) for a vehicle on which the vehicle seat 10 is mounted, a passenger sitting on the vehicle seat 10 is strongly pressed against the seat cushion 11 and the seat back 12 due to an inertia, and a load is applied in a lower rear direction to the frame structure of the vehicle seat 10. The enmeshing part of the pinion 33 and the sector gear 22e receives a load of a force that lowers the vehicle seat 10 downward. In this regard, in a case where a countermeasure according to present embodiment described below is not taken, when a strong load to move the vehicle seat 10 in the lower rear direction is applied, the pinion 33 and the sector gear 22e cause an enmeshing failure, and the teeth of the sector gear 22e and the pinion 33 cannot withstand the load and break.

As a result of study and experiments conducted by the applicants, it has been found that, when the countermeasure according to the present embodiment is not taken, and a very strong rear collision load acts, deformation that extends the rear part of the side frame 14 in the rear direction occurs, an inter-axial distance between the pinion 33 and the sector gear plate 22d becomes longer, and an enmeshing amount of the pinion 33 and the sector gear 22e in the front/rear direction becomes small. Furthermore, the very strong rear collision load causes a tilt of one or both of the pinion 33 and the sector gear plate 22d in the vehicle width direction, respective tooth surfaces of the pinion 33 and the sector gear 22e do not appropriately meet each other face to face, and a load of an irregular direction that crosses the upper/lower direction is input to an enmeshing portion. These phenomena are assumed as causes of the above-described enmeshing failure.

To prevent such a failure, the frame structure according to the present embodiment has the improved strength around the gear mechanisms as described below. First, the reinforcement plate 25 that is the reinforcement member is attached to a rear part area of the side frame 14 in which the pinion 33 and the sector gear plate 22d are disposed. Cross-sectional strength is improved by adding a thickness of the reinforcement plate 25 to the original thickness of the side frame 14, and the side frame 14 hardly deforms.

The reinforcement plate 25 has a shape that overlaps the rear step part 14d in an area between the rear pipe 16 (the through hole 14f and the through hole 22b) that is a rotary shaft of the sector gear plate 22d, and the through hole 14g that is a position reference of the pinion 33. Furthermore, the thickness of the reinforcement plate 25 is larger than the thickness of the side frame 14. Consequently, the reinforcement plate 25 can effectively suppress deformation of the side frame 14 that changes the interval between the through hole 14f and the through hole 14g.

As a more detailed configuration, as illustrated in FIGS. 7 to 10, the reinforcement plate 25 includes a first area 25c (first extension part) that extends toward the rear pipe 16 side, and a second area 25d (second extension part) that extends toward a side (front) opposite to the rear pipe 16 using as a position reference the through hole 25a to be penetrated by the pinion base part 34 that is part of the pinion 33. The first area 25c has a longer length from the through hole 25a (longer in the front/rear direction) than the second area 25d, and the first area 25c overlaps the rear step part 14d in an almost entire range between the pinion 33 and the rear pipe 16 in the front/rear direction. That is, the reinforcement plate 25 reinforces large part of the range from the pinion 33 to the rear pipe 16 by the first area 25c. Furthermore, the reinforcement plate 25 includes the second area 25d that protrudes in the front direction compared to the pinion 33, so that improvement of strength around the pinion 33 is realized.

The receiving hole 25b of the reinforcement plate 25 is formed in the first area 25c. As described above, the diameter (inner diameter) of the receiving hole 25b is set to have a predetermined gap or more with respect to the collar 47.

When a strong rear collision load is applied to the vehicle seat 10, and the side frame 14 slightly deforms, the gap between the collar 47 and the receiving hole 25b narrows, and the outer circumferential face of the collar 47 and the inner circumferential face of the receiving hole 25b contact. This contact provides a reinforcement effect of preventing the side frame 14 from deforming more between the reinforcement plate 25 and the support plate 40.

When, for example, a load is applied in a direction to increase the inter-axial distance between the pinion 33 and the sector gear 22e, the outer circumferential surface of the collar 47 contacts a part on a side in the front direction of the inner circumferential surface of the receiving hole 25b, and a portion that withstands the load is formed. Consequently, the reinforcement plate 25 plays both of a role of reinforcing the side frame 14 itself, and a role of receiving the load to be applied to the support plate 40 and reducing the load on the side frame 14, so that it is possible to effectively suppress an increase in an inter-axial distance (a decrease in an enmeshing amount) between the pinion 33 and the sector gear 22e.

The reinforcement plate 25 plays a role of preventing an increase in the inter-axial distance between the pinion 33 and the sector gear 22e, and, in addition, suppressing a tilt (a fall in the vehicle width direction direction) of both of the sector gear plate 22d and the pinion 33.

First, the reinforcement plate 25 is disposed between the side frame 14 and the sector gear plate 22d in the vehicle width direction to fill a space between the side frame 14 and the sector gear plate 22d. Consequently, when the sector gear plate 22d significantly tends to tilt toward the seat outer side, the sector gear plate 22d contacts a side surface of the reinforcement plate 25, and the reinforcement plate 25 can prevent the sector gear plate 22d from tilting more.

Furthermore, contact of the collar 47, and the receiving hole 25b and the side frame 14 suppresses movement and a tilt in the front/rear direction of the support plate 40 with respect to the side frame 14 and the reinforcement plate 25. The support plate 40 supports the pinion shaft 33a by the pinion support hole 42a, so that suppression of the movement and suppression of the tilt in the front/rear direction of the support plate 40 contributes to suppression of the movement and suppression of the tilt in the front/rear direction of the pinion 33. Furthermore, contact of the inner circumferential surface of the through hole 25a and the outer circumferential surface of the pinion base part 34 provides an effect of suppression of the movement and suppression of the tilt in the front/rear direction of the pinion 33.

The gap between the collar 47 and the receiving hole 25b is set smaller than the gap between the collar 47 and the long hole 22f, so that the collar 47 and the receiving hole 25b preferentially contact, and the collar 47 and the long hole 22f keep a separated state. That is, it is possible to reliably pass the load between the collar 47 and the reinforcement plate 25 without influencing position accuracy of the sector gear plate 22d and the operation of the rear link 22.

According to the above configuration and function, the frame structure according to the present embodiment can suppress a change in relative positions of the pinion 33 and the sector gear plate 22d at a time of input of a rear collision load, and remarkably improve load withstanding performance around the gear mechanisms compared to existing frame structures.

The reinforcement plate 25 is attached only to a portion of the side frame 14 for which a high strength request for a rear collision load is demanded, and therefore the plate thickness of the entire side frame 14 does not need to be increased. Consequently, even a small and light structure that is not accompanied by an increase in a weight of the side frames 14 can realize improvement of strength of the frame structure. Furthermore, the side frames 14 of the large plate thicknesses are not used, so that workability of the side frames 14 is good, material fees are also low, and manufacturing cost can be suppressed. The reinforcement plate 25 adopts a simple structure that the through hole 25a and the receiving hole 25b that penetrate in a plate thickness direction are formed using as a base a flat plate shape along the rear step part 14d of the side frame 14, and can be obtained at low cost.

The collar 47 plays a role as a spacer for filling a gap between the rear extension part 43 of the support plate 40 and the rear step part 14d of the side frame 14 to fasten, and a role of passing a load between the support plate 40 and the reinforcement plate 25. Consequently, it is possible to contribute to improvement of strength of the frame structure with a simple configuration without making the structure of the support plate 40 complicated.

Although the above description has focused upon a load that increases the inter-axial distance between the pinion 33 and the sector gear plate 22d, the frame structure according to the present embodiment is effective likewise for a load that decreases an inter-axial distance between the pinion 33 and the sector gear plate 22d. The reinforcement plate 25 including the first area 25c located between the through hole 14g and the through hole 14f provides an effect of suppressing deformation of the side frame 14 in a direction in which the interval between the through hole 14g and the through hole 14g is decreased (i.e., the inter-axial distance between the pinion 33 and the sector gear plate 22d is decreased). Furthermore, the outer circumferential surface of the collar 47 contacts a part on a side in the rear direction of the inner circumferential surface of the receiving hole 25b, so that it is possible to withstand a load in a direction in which the inter-axial distance between the pinion 33 and the sector gear 22e is decreased.

A position of the receiving hole 25b that is the insertion part of the reinforcement plate 25 is set under a condition that the receiving hole 25b can exhibit an effect of suppressing a change in the inter-axial distance between the pinion 33 and the sector gear plate 22d, and adopts a structure (an area and the thickness) that surroundings of the receiving hole 25b can sufficiently withstand a load from the collar 47. The first area 25c that is located between the pinion 33 and the rear pipe 16 and is longer (i.e., has a larger area) than the second area 25d satisfies the condition, and therefore the receiving hole 25b is formed in the first area 25c.

The above condition is satisfied, and, moreover, the receiving hole 25b has a degree of freedom to set a formation position thereof. According to, for example, the present embodiment, there are the welding positions W near the rear end of the reinforcement plate 25, and the receiving hole 25b is disposed at a position (a vicinity of a center in the front/rear direction in the first area 25c) that is ahead of and apart to some degree from the welding positions W. However, in a case where there is no restriction on the welding positions W or the like, the receiving hole 25b may be disposed more in the rear direction (near the through hole 14f). By setting a load reception portion of the receiving hole 25b and the collar 47 close to the rear direction near the through hole 14f, it is easy to suppress deformation (stretch) of the side frame 14 in a direction in which the inter-axial distance between the pinion 33 and the sector gear plate 22d is increased.

FIG. 8 illustrates a virtual line P1 that connects a center of the pinion shaft 33a of the pinion 33 and a center of the rear pipe 16 seen from the lateral side. An enmeshing position of the sector gear 22e with respect to the pinion 33 is located substantially on the virtual line P1. Furthermore, by setting the load reception portion of the receiving hole 25b and the collar 47 on the virtual line P1 or at a position close to the virtual line P1 seen from the lateral side, it is possible to enhance an effect of preventing a change in the interval between the pinion 33 and the rear pipe 16 (i.e., a change in the inter-axial distance between the pinion 33 and the sector gear plate 22d). In the present embodiment, the receiving hole 25b is located in a close range of the virtual line P1, and satisfies the condition. According to a modified example, it is also possible to place the receiving hole 25b close to the virtual line P1 compared to the present embodiment, and set an arrangement where the receiving hole 25b overlaps the virtual line P1.

In the present embodiment, the collar 47 in which the fixing screw 45 is inserted is used as a part on the support plate 40 side that is inserted in the receiving hole 25b of the reinforcement plate 25. As described above, the collar 47 plays a plurality of roles, so that it is possible to realize improvement of the strength of the frame structure while simplifying the configuration of the support plate 40 side. However, in the modified example different from the present embodiment, it is also possible to apply a part other than a collar for fixing screw insertion as a part on a support member (support plate 40) side in which an insertion part (receiving hole 25b) of a reinforcement member (reinforcement plate 25) is inserted.

Although the above embodiment has exemplified the frame structure that includes the lifter mechanisms 20 for seat lifting and the driving unit 30, the present invention is applicable to a structure that includes a gear mechanism for use other than seat lifting. Consequently, the drive input gear according to the present invention may be a gear other than a sector gear for seat lifting.

Furthermore, the embodiment of the present invention is not limited to the above embodiment and the modified example thereof, and can be variously changed, replaced and modified without departing from the spirit of the technical idea of the present invention. Furthermore, if technical development and other techniques deriving therefrom can realize the technical idea of the present invention by another method, the technical idea of the present invention can be carried out using the another method. Accordingly, the claims cover all embodiments that can be included within the range of the technical idea of the present invention.

REFERENCE SIGNS LIST 10 vehicle seat
11 seat cushion (seat surface part)
12 seat back
13 cushion frame
14 side frame (seat frame)
14c front step part
14d rear step part
14f through hole
14g through hole
14h fastening hole
14i fastening hole
15 front pipe
16 rear pipe (rotary shaft of drive input gear)
20 lifter mechanism
21 front link
22 rear link
22b through hole
22c arm part
22d sector gear plate (drive input gear)
22e sector gear (drive input gear)
22f long hole
25 reinforcement plate (reinforcement member)
25a through hole
25b receiving hole (insertion part)
25c first area (first extension part)
25d second area (second extension part)
30 driving unit
31 motor
32 gear housing
33 pinion
33a pinion shaft (part of pinion)
34 pinion base part (part of pinion)
35 seat surface plate
40 support plate (support member)
42 pinion cover part
42a pinion support hole
43 rear extension part
43a fitting hole
44 fixing screw
45 fixing screw (fixing member)
46 nut
47 collar (part of support member, vehicle width direction extended part)
47a internal through hole
47b fitting step part
48 nut

What is claimed is:

1. A frame structure of a vehicle seat comprising:
a seat frame that constitutes a seat surface part of the vehicle seat;
a pinion that is rotatably attached to the seat frame, and protrudes from an outer side to an inner side in a vehicle width direction;
a drive input gear that is disposed on the inner side in the vehicle width direction with respect to the seat frame, is rotatable about a rotary shaft at a position different from the pinion, and in mesh with the pinion;
a reinforcement member that is disposed between the seat frame and the drive input gear in the vehicle width direction, and is fixed to the seat frame; and
a support member that is disposed on the inner side in the vehicle width direction with respect to the seat frame with the drive input gear and the reinforcement member interposed therebetween, supports part of the pinion, and is fixed to the seat frame,
wherein part of the support member comes into contact with the seat frame through an insertion part provided to the reinforcement member.

2. The frame structure of the vehicle seat according to claim 1, further comprising a fixing member that fixes the pinion to the seat frame,
wherein the support member is also supported at the seat frame by the fixing member.

3. The frame structure of the vehicle seat according to claim 2, wherein
the reinforcement member includes
a through hole that penetrates the part of the pinion,
a first extension part that extends toward a side of the rotary shaft of the drive input gear with the through hole serving as a position reference, and a second extension part that extends toward a side opposite to the rotary shaft of the drive input gear with the through hole serving as the position reference, and the first extension part has a longer length from the through hole than the second extension part.

4. The frame structure of the vehicle seat according to claim 3, wherein the insertion part is provided to the first extension part.

5. The frame structure of the vehicle seat according to claim 1, wherein the reinforcement member includes a through hole that penetrates the part of the pinion, a first extension part that extends toward a side of the rotary shaft of the drive input gear with the through hole serving as a position reference, and a second extension part that extends toward a side opposite to the rotary shaft of the drive input gear with the through hole serving as the position reference, and the first extension part has a longer length from the through hole than the second extension part.

6. The frame structure of the vehicle seat according to claim 5, wherein the insertion part is provided to the first extension part.

7. The frame structure of the vehicle seat according to claim 1, further comprising a fixing member that fixes the pinion to the seat frame, wherein the drive input gear includes an arc-shaped long hole whose center is the rotary shaft, the part of the support member is a vehicle width extension part that is inserted in the long hole and the insertion part and comes into contact with the seat frame, and a gap between the vehicle width direction extended part and the insertion part is smaller than a gap between the vehicle width direction extended part and the long hole.

8. The frame structure of the vehicle seat according to claim 7, wherein the fixing member is a screw, and the vehicle width direction extended part is cylindrical, and the screw that fastens and fixes the seat frame and the support member is inserted inside the vehicle width direction extended part.

\* \* \* \* \*